(No Model.) 2 Sheets—Sheet 1.

C. LA DOW.
HARNESS.

No. 339,902. Patented Apr. 13, 1886.

WITNESSES
Ed. A. Newman.
Al. C. Newman.

INVENTOR
Charles La Dow (No Model.)

2 Sheets—Sheet 2.

C. LA DOW.
HARNESS.

No. 339,902.  Patented Apr. 13, 1886.

WITNESSES
Ed. A. Newman
Al. C. Newman

INVENTOR
Charles LaDow

UNITED STATES PATENT OFFICE.

CHARLES LA DOW, OF ALBANY, NEW YORK.

HARNESS.

SPECIFICATION forming part of Letters Patent No. 339,902, dated April 13, 1886.

Application filed February 19, 1886. Serial No. 192,577. (No model.)

*To all whom it may concern:*

Be it known that I, CHARLES LA DOW, a citizen of the United States, residing at Albany, in the county of Albany and State of New York, have invented new and useful Improvements in Harness, of which the following is a specification.

My invention relates to that class of harness draft devices employing a yoke suspended, preferably, beneath the team, dispensing with traces connected with a double-tree at the rear of the team.

My invention consists in suspending beneath each horse a curved yoke connected by short traces to the collar, and adjustably connecting each yoke to the horizontal evener-bar beneath the horses.

It also consists in attaching the yokes to the evener-bar by pivoted links which are rigid in cross-section, and which allow the yokes to have lateral motion relatively to the evener-bar.

My invention further consists in placing the evener-bar in the rear of the yokes, in order that the draft applied to the said evener-bar may overcome the torsional strain of the curved yokes, and the evener-bar be thereby prevented from being unduly tilted upward.

It also consists in providing the yokes with an anti-friction device located between the yokes and evener-bar to reduce the friction incident to the torsional strain between said parts.

It also consists in combining a pivoted draft-link with the evener-bar, to play laterally in a plane substantially coincident with the plane of the evener-bar, which shall assist the yoke-links to maintain the yokes in a vertical position.

It also consists in means for shortening and lengthening the pivoted links to increase the lateral play of the yokes, and to give the evener-bar increased or diminished leverage relatively to the draft-strain applied to the upper ends of the yokes.

The annexed drawings, on two sheets, are made a part of the specification, the same letters of reference indicating corresponding parts in all the figures.

Figure 1:
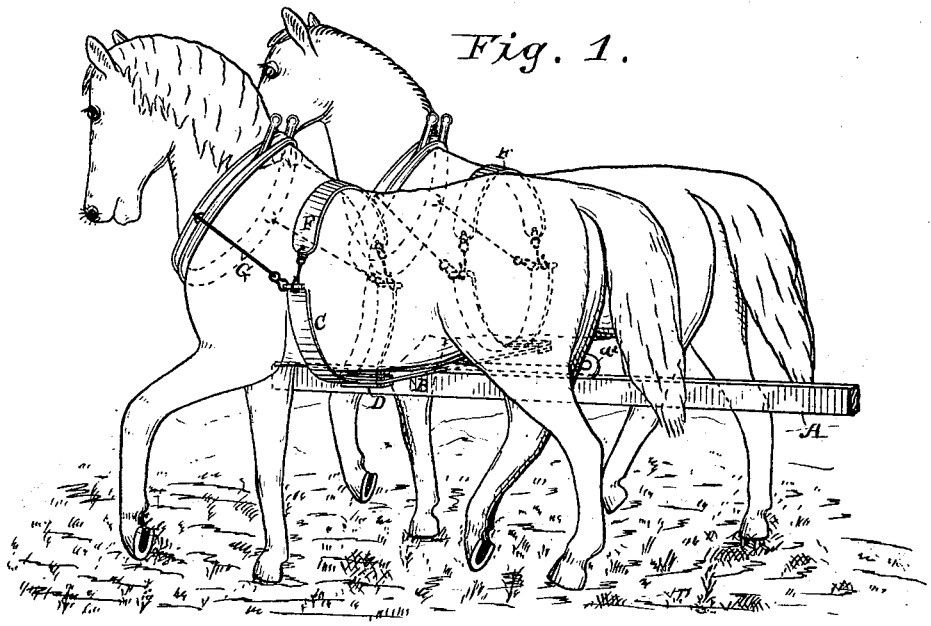
Figure 2:
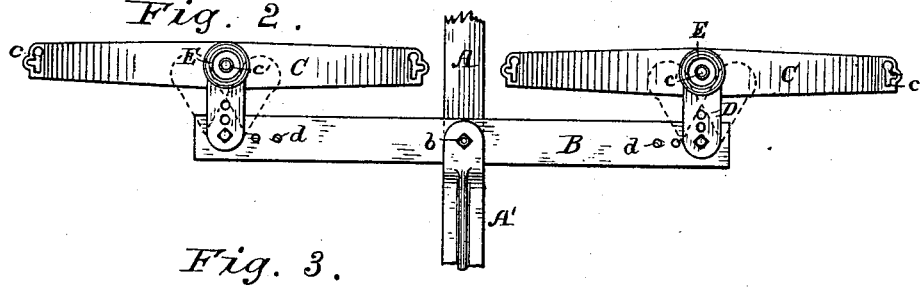
Figure 3:
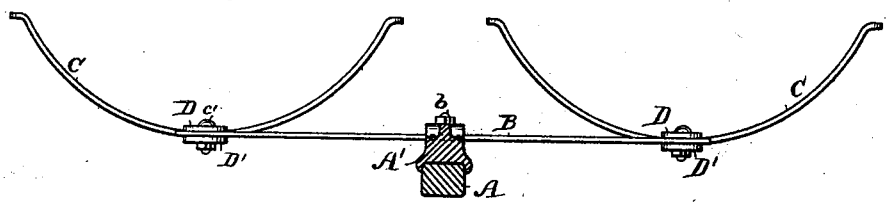
Figure 4:
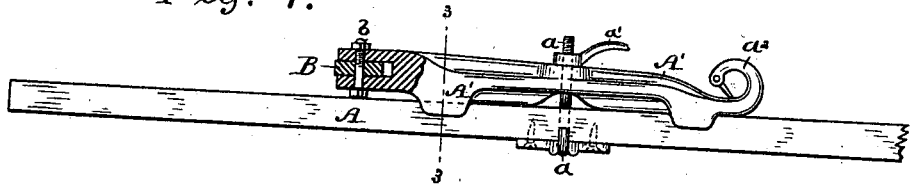
Figure 5:
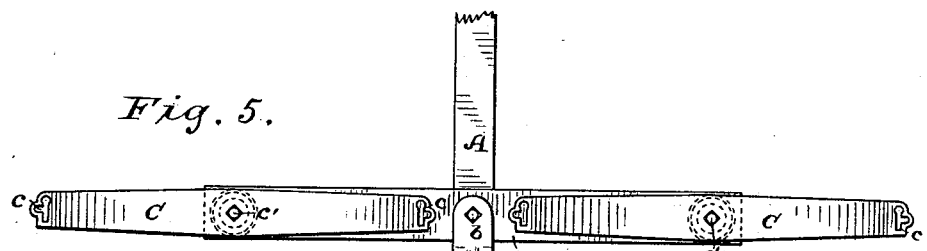
Figure 6:
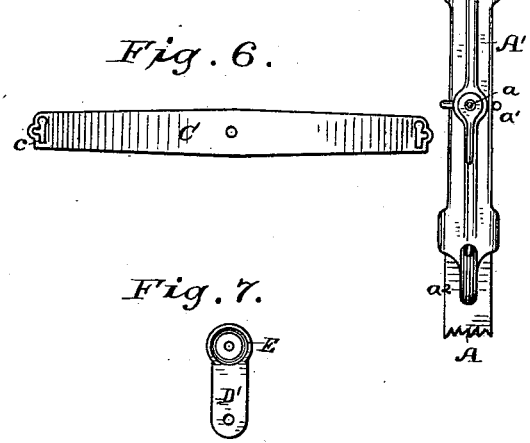
Figure 8:
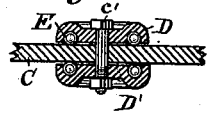
Figure 7:
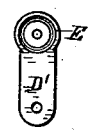
Figure 9:
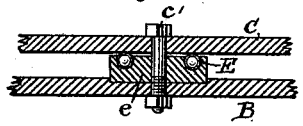
Figure 12:
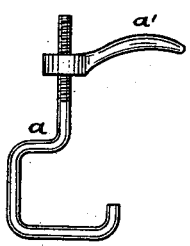
Figure 13:
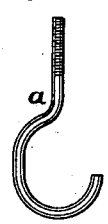
Figure 10:
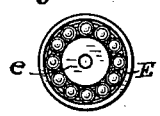
Figure 11:
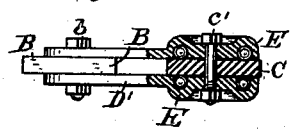

Figure 1 is a perspective view of my appliance attached to a team and pole. Fig. 2 is a top view of the yokes linked to the evener-bar and section of pole and draft-link. Fig. 3 is a rear view of yokes and evener-bar and vertical section through pole and coupling or draft-link. Fig. 4 is a side view of draft-link attached to a pole, and longitudinal section through the link at the pivotal point of the evener-bar therewith. Fig. 5 is a top view of the pole, coupling-link, and yokes mounted pivotally directly on their evener-bar. Fig. 6 is a top view of a yoke detached. Fig. 7 is detached one-half of the link which connects a yoke to the evener-bar. Fig. 8 is a vertical longitudinal section through a yoke at its pivotal point between the plates of the anti-friction link. Fig. 9 shows a vertical section through the anti-friction mechanism when a yoke is mounted above the evener-bar. Fig. 10 shows balls in the annular groove in the inner side of a plate of the yoke-link. Fig. 11 is a side view of the two plates of a yoke-link attached to the evener-bar, and a vertical section through the ends of the same where they are pivoted to a yoke. Figs. 12 and 13 are devices preferably employed to mount the coupling or draft link to the evener-bar.

A band of tempered steel or other suitable material, C, arched downwardly, is employed to pass from side to side beneath the horse, and each end of said band is bent outwardly into a lip and perforation, $c$, so that the tug and back-band couplings shall not rub against the horse. For each yoke a back-band, F, is provided, each end of which is hooked into its respective eye $c$. Short tugs G pass from the collar to each end of the yoke and hook in the eye $c$. The back-band and arched yoke thus encircle the horse, and are readily detached from each other or from the tugs. Each yoke is at its lower part mounted on an evener-bar, B, preferably by means of a double-pivoted lateral moving link. These links I construct preferably, as shown in Fig. 7, of two plates, each provided with a lip, E, having an annular groove for the reception of the anti-friction balls. Between the lips of these two plates I pivot a yoke, Figs. 8 and 11, so that the yoke can rotate freely upon its pivot $c'$, and between the circles of balls, in concert with the alternate motions of the horse's shoulders. These links are pivoted to the ends of the evener-bar B, which is provided with holes $d$ for the reception of the pivot, so that the yokes may be adjustably attached thereto, whereby the team can be harnessed near together or far apart. These links are also preferably adjustable in length. By this method of attachment each yoke has a lateral motion relatively to the evener-bar, to allow ample latitude for the swaying of the horses in the harness or the lateral swaying of the evener-bar. The object to be hauled by the team is attached to the evener-bar by means of a pole or chain or suitable draft-link.

Obviously, as the power of the team is applied through the upper lips or ends of the yokes, the yokes are subjected to torsional strain, which reacts directly through the yoke-links D, and tends to elevate their rear ends and the evener-bar pivoted thereto. The yoke-links are therefore constructed rigid in cross-section, and preferably adjustable in length, so that the draft of the load to be moved by the team, acting through the links, shall counterbalance the torsion-strain of the yokes and maintain the yokes in a vertical position beneath the team.

Obviously, in action, the torsion-points are at the junction of the yokes and links and of the evener-bar and links. At the former there is a forward and upward torsion, and at the latter a backward and downward torsion, which counterbalance each other and maintain the yokes in equipoise.

The yokes may be mounted above the evener-bar, and the yoke-links D may be dispensed with, in which case, to accomplish the purpose subserved by the links, I pivot a draw or coupling bar, A, rigid in cross-section, to the evener-bar, through which the draft of the load to be drawn maintains the equilibrium of the yokes. When this construction is employed, I mount upon the evener-bar B, at its pivotal point with the yoke, a plate grooved as above described, for the reception of anti-friction balls, and upon which the yoke oscillates, Fig. 9, as above described. This coupling-bar is provided with a hook, $a^2$, to which the load may be attached, and also with a clamp, $a$, for attaching it to a pole. In the latter case I preferably provide upon the pole a grooved plate or block, and pass the clamp or segmental loop $a$ about it and up through the coupling-bar A, and clamp the parts together with a nut. The coupling-bar is thus firmly mounted on the pole, and the yokes are maintained vertical. The coupling-bar A′ may be also used with the yoke-links, and may stand vertically above the evener-bar B, if desired. Furthermore, the back-strap F may be attached directly to the evener-bar, so that the said bar shall be suspended directly from the back-straps and the connection between the straps and yokes dispensed with.

This draft device, as hereinbefore described, may be suspended in front of the team from the collars, in which case the operation of the parts and their efficiency will be substantially the same as hereinbefore described.

The anti-friction balls may be omitted, and in such case the yokes will swing either on links which have no annular grooves or directly on the evener-bar.

It is obvious that the annular grooves for the balls may be either in the yokes or evener-bar, instead of in the links; also, the yokes C C may be laterally adjusted on bar B, whether links D are used or not.

Having described my invention, what I claim is—

1. In a horse-yoke, an evener-bar, B, and curved yokes C C, laterally adjustable relatively to the bar B, in combination with draft-tugs G.

2. In a horse-yoke, the bar B and yokes C C, in combination with links D D, said links being rigid in cross-section, pivoted to the yokes and evener-bar, and adapted to permit lateral movement of the yokes relatively to the evener-bar.

3. In a horse-yoke, the combination of yokes C C, tugs G, and evener-bar B, arranged in rear of the yokes, said yokes having pivotal connections between them and the evener-bar, and also having straps F to support said yokes in proper working position.

4. In a horse-yoke, the evener-bar B and yokes C C, in combination with anti-friction rollers located between the yokes and evener-bar.

5. In a horse-yoke, the evener-bar B and curved yokes C C, in combination with the draft-link A′, said draft-link being rigid in cross-section.

6. In a horse-yoke, the evener-bar B, curved yokes C C, and perforated links D D, adapted to regulate the distance between the yokes and evener-bar, and thereby prevent undue lifting of the evener-bar.

7. In a horse-yoke, the evener-bar B, with yokes C C, having their ends curved outward, in combination with suitable collars for attaching the yoke to the team, and connecting devices, substantially as described.

8. In a horse-yoke, the combination of vertically-curved yokes C C and an evener-bar, B, provided with holes $d$, or other equivalent means for adjusting and holding said yokes pivotally at any desired point relatively to each other on the bar.

In testimony whereof I have hereunto subscribed my name.

CHARLES LA DOW.

Witnesses:
W. C. DUVALL,
B. I. STANTON.